United States Patent
Yanai

(10) Patent No.: US 8,033,587 B2
(45) Date of Patent: Oct. 11, 2011

(54) FRAME MOLDING FASTENING STRUCTURE

(75) Inventor: Toshifumi Yanai, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/060,524

(22) PCT Filed: Sep. 11, 2009

(86) PCT No.: PCT/JP2009/065946
§ 371 (c)(1),
(2), (4) Date: Feb. 24, 2011

(87) PCT Pub. No.: WO2010/035645
PCT Pub. Date: Apr. 1, 2010

(65) Prior Publication Data
US 2011/0163563 A1    Jul. 7, 2011

(30) Foreign Application Priority Data
Sep. 26, 2008  (JP) ................................. 2008-248494

(51) Int. Cl.
*B60R 13/02* (2006.01)

(52) U.S. Cl. .................................................... 296/1.08
(58) Field of Classification Search ................. 296/1.08, 296/146.2, 146.5
See application file for complete search history.

(56) References Cited

U.S. PATENT DOCUMENTS

| 4,399,600 A | * | 8/1983 | Draper et al. | ................. 29/401.1 |
| 5,275,455 A | * | 1/1994 | Harney et al. | ................. 296/1.08 |
| 2010/0181798 A1 | | 7/2010 | Takeuchi et al. | |

FOREIGN PATENT DOCUMENTS

| JP | 1-169419 | 11/1989 |
| JP | 2-121419 | 10/1990 |
| JP | 4-67106 | 6/1992 |
| JP | 5-32042 | 4/1993 |
| JP | 5-155248 | 6/1993 |
| JP | 6-344771 | 12/1994 |
| JP | 2005-263094 | 9/2005 |

OTHER PUBLICATIONS

International Search Report.

* cited by examiner

*Primary Examiner* — Lori Lyjak
(74) *Attorney, Agent, or Firm* — Finnegan, Henderson, Farabow, Garrett & Dunner, LLP

(57) ABSTRACT

A frame molding fastening structure is disclosed. The frame molding includes a first molding, a second molding, and a bracket that fastens the first and second molding to each other. The bracket includes a fixed portion fixed to the first molding and an insertion portion inserted into the second molding. The insertion portion includes a main body and a resin member. The main body includes a first portion, which is located at one end side of a cross-section perpendicular to an insertion direction of the insertion portion relative to the second molding, and a second portion, which is located at an end portion at an opposite side of the first portion. The resin member is arranged in at least either one of the first portion and the second portion to abut an inner surface of the second molding.

5 Claims, 4 Drawing Sheets

FRAME MOLDING FASTENING STRUCTURE

TECHNICAL FIELD

The present invention relates to a frame molding fastening structure of a vehicle.

BACKGROUND ART

FIGS. 5 and 6 show a frame molding fastening structure of a vehicle. FIG. 5 is a schematic view showing a frame molding of the prior art from the inner side of a vehicle. FIG. 6 is a cross-sectional view taken along line 6-6 in FIG. 5. More specifically, FIG. 6 is a cross-sectional view of a coupling portion 110 arranged between a rear molding 103, which forms a frame molding, and a belt molding 106, as seen from the belt molding 106. As shown in FIG. 6, a stainless bracket 120 includes a first insertion portion 121 inserted into the belt molding 106. The first insertion portion 121 includes an upper end portion 121a that abuts an inner surface 106a of a cornered portion having a reversed-L shape and located at an upper side of the belt molding 106. The first insertion portion 121 includes a lower end portion 121b that is curved to have an arc-shaped cross-section. The lower end portion 121b includes a convex surface 121c and a lower end surface 121d, either one of which abuts an inner surface 106b of a generally U-shaped bent portion, which is located at the lower side of the belt molding 106. Thus, the belt molding 106 supports the bracket 120 at two points, which are the inner surface 106a of the cornered portion and the inner surface 106b of the bent portion. As shown in FIG. 5, the bracket 120 includes a second insertion portion 122 inserted into a lower end section of the frame molding 103. The second insertion portion 122 is crimped by a crimping hook (not shown), which is arranged in the rear molding 103. This fixes the bracket 120 to the frame molding 103.

Patent document 1 discloses a belt molding that extends along an upper rim of a main body of a vehicle door and includes a main body portion and a garnish portion. A coupling bracket couples the main body portion and the garnish portion, and an attachment bracket attaches the garnish portion to a door panel. The coupling bracket and the mounting bracket are integrated to form an integrated bracket.

PRIOR ART DOCUMENT

Patent Document
  Patent Document 1 . . . Japanese Laid Open Patent Publication No. 6-344771

SUMMARY OF THE INVENTION

In the fastening structure shown in FIG. 6, the belt molding 106 is designed to support the bracket 120 at two points. However, the belt molding 106 is formed by performing roll molding. Thus, dimensional variations are produced in the cross-section that is perpendicular to a longitudinal direction of the belt molding 106. This results in a state in which the first insertion portion 121 is supported by either one of the upper end portion 121a and the lower end portion 121b, and causes the coupling portion 110 between the belt molding 106 and the frame molding 103 to be loose or corrugated.

Patent document 1 states that the integrated bracket is welded and joined to the garnish portion at a joint portion between the coupling bracket and the attachment bracket. Then, the coupling bracket fastens the main body portion and the garnish portion to each other with a bolt, and the attachment bracket is fastened to the door panel by a bolt. Thus, there are many coupling steps.

It is an object of the present invention to provide a frame molding fastening structure that prevents a coupling portion arranged between two moldings from becoming loose or corrugated, while also improves the rigidity of the coupling portion and reducing the number of coupling steps.

To solve the above problem, one aspect of the present invention provides a frame molding fastening structure. The frame molding includes a rear molding, a belt molding, and a bracket that fastens the rear and belt molding to each other. The bracket includes a fixed portion fixed to the rear molding and an insertion portion inserted into the belt molding. The insertion portion includes a main body and a resin member. The main body includes an upper end portion, which is located at one end side of a cross-section perpendicular to an insertion direction of the insertion portion relative to the belt molding, and a lower end portion, which is located at an end portion at an opposite side of the upper end portion. The resin member is arranged in at least either one of the upper end portion and the lower end portion to abut an inner surface of the belt molding.

In this aspect of the present invention, the resin member is arranged in at least either one of the upper end portion and lower end portion and abuts an inner surface in the end portion side of the belt molding. This increases the abutment area of the resin member, prevents the coupling portion arranged between the bracket and the belt molding from becoming loose or corrugated, and improves the torsion and bending rigidity of the coupling portion.

Further, the above-described structure eliminates the need for welding and bolts to perform fastening at the coupling portion, and reduces the fastening and coupling steps of the rear molding and belt molding.

Preferably, the resin member includes a rib that abuts the inner surface.

In the above-described structure, the resin member includes a rib, and the rib abuts and fits to the inner surface of the bag-shaped cross-section of the belt molding. This greatly increases the area in which the rib abuts the inner surface of the belt molding in comparison with the abutment area of the prior art. Further, the arrangement of the rib increases the pressing surface pressure of the resin member relative to the inner surface of the belt molding. As a result, the coupling portion arranged between the bracket and the belt molding is prevented from becoming loose or corrugated, and the torsion rigidity is improved.

Preferably, the resin member contains glass fibers.

In the above-described structure, the resin member is formed containing, for example, glass fibers in polypropylene. This increases the strength and bending rigidity of the bracket, which in turn, increases the strength and bending rigidity of the coupling portion between the rear molding and belt molding.

Preferably, the belt molding includes an upper end portion and a lower end portion in a cross-section perpendicular to the insertion direction, the upper end portion includes at least two surfaces forming a generally L-shaped inner surface, and the resin member includes two surfaces facing toward the two surfaces of the upper end portion.

Preferably, the two surfaces of the resin member each include a rib.

Preferably, the main body of the insertion portion is formed from metal, the resin member is arranged in only the upper end portion of the main body, and the lower end portion of the main body abuts the inner surface of the lower end portion of the main body.

DETAILED DESCRIPTION OF THE PREFERRED EMBODIMENTS

Figure 1:
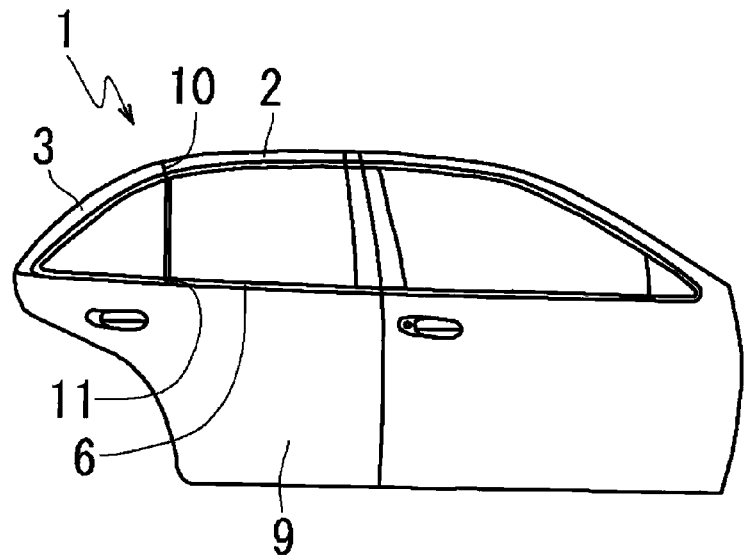
FIG. 1 is a partial side view showing a frame molding according to one embodiment of the present invention.
Figure 2:
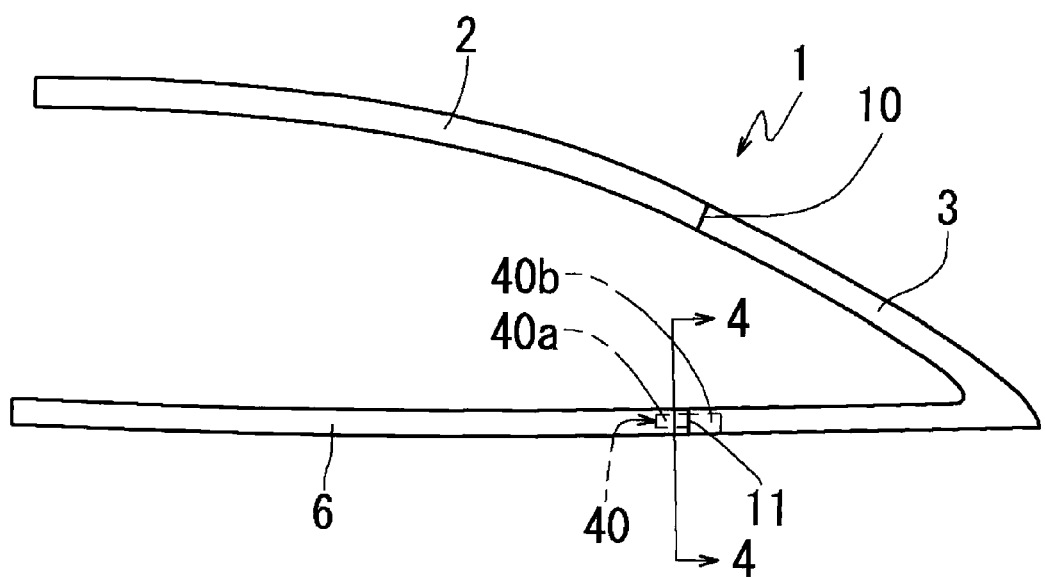
FIG. 2 is a schematic view showing the frame molding of FIG. 1 from an inner side of a vehicle.

One embodiment of the present invention will now be discussed in detail with reference to the drawings. FIG. 1 is a partial side view showing a vehicle including a frame molding 1 according to one embodiment of the present invention. FIG. 2 is a schematic view of the frame molding 1 shown in FIG. 1 and used on a right rear door 9 and is taken from the inner side of the vehicle.

As shown in FIGS. 1 and 2, the frame molding 1 includes an upper molding 2 (second molding), a rear molding 3 (first molding), and a belt molding 6 (second molding). A coupling portion 10 couples the upper molding 2 and the rear molding 3, and a coupling portion 11 couples the rear molding 3 and the belt molding 6. The upper molding 2 and the belt molding 6 are relatively large, have a substantially uniform radius of curvature, and are molded, for example, by performing rolling. The rear molding 3 is bent along a window frame at a rear door portion and molded by performing a pressing process. The frame molding 1 is an ornamental part that decorates the rim of the door 9 and is thus referred to as a garnish.

Figure 3:
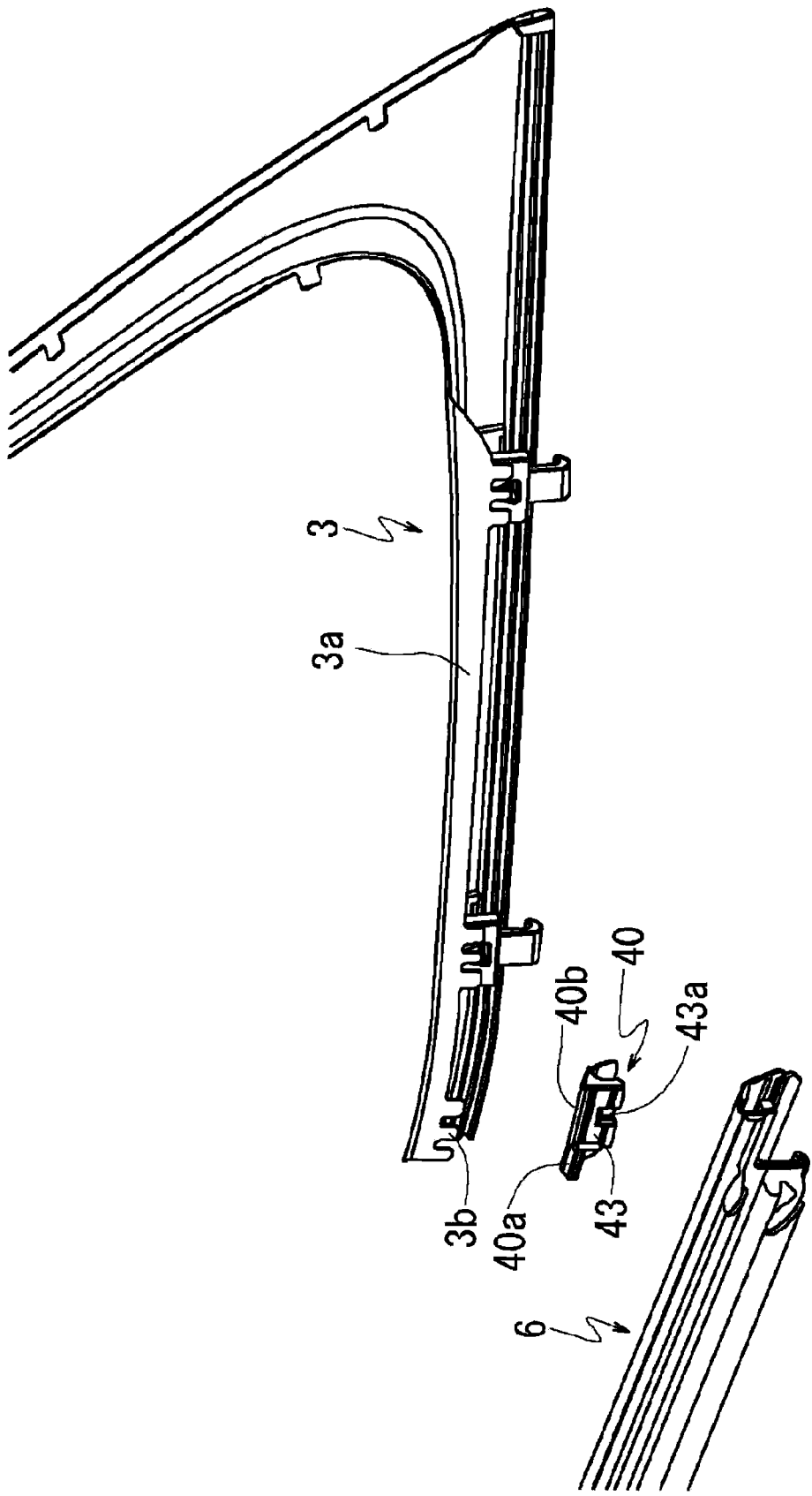
FIG. 3 is an exploded perspective view showing a frame molding of FIG. 1.

FIG. 3 is an exploded perspective view of the frame molding 1 and shows a fastening structure of a lower part 3a of the rear molding 3 and the belt molding 6. As shown in FIG. 3, the two ends of a bracket 40 are inserted into and fastened to the rear molding 3 and the belt molding 6, respectively. The bracket 40 includes an insertion portion 40a, which is inserted into the belt molding 6, and a fixed portion 40b, which is inserted into the rear molding 3 and fixed to the rear molding 3. The fixed portion 40b is crimped by a crimping hook 3b of the rear molding 3.

Figure 4:
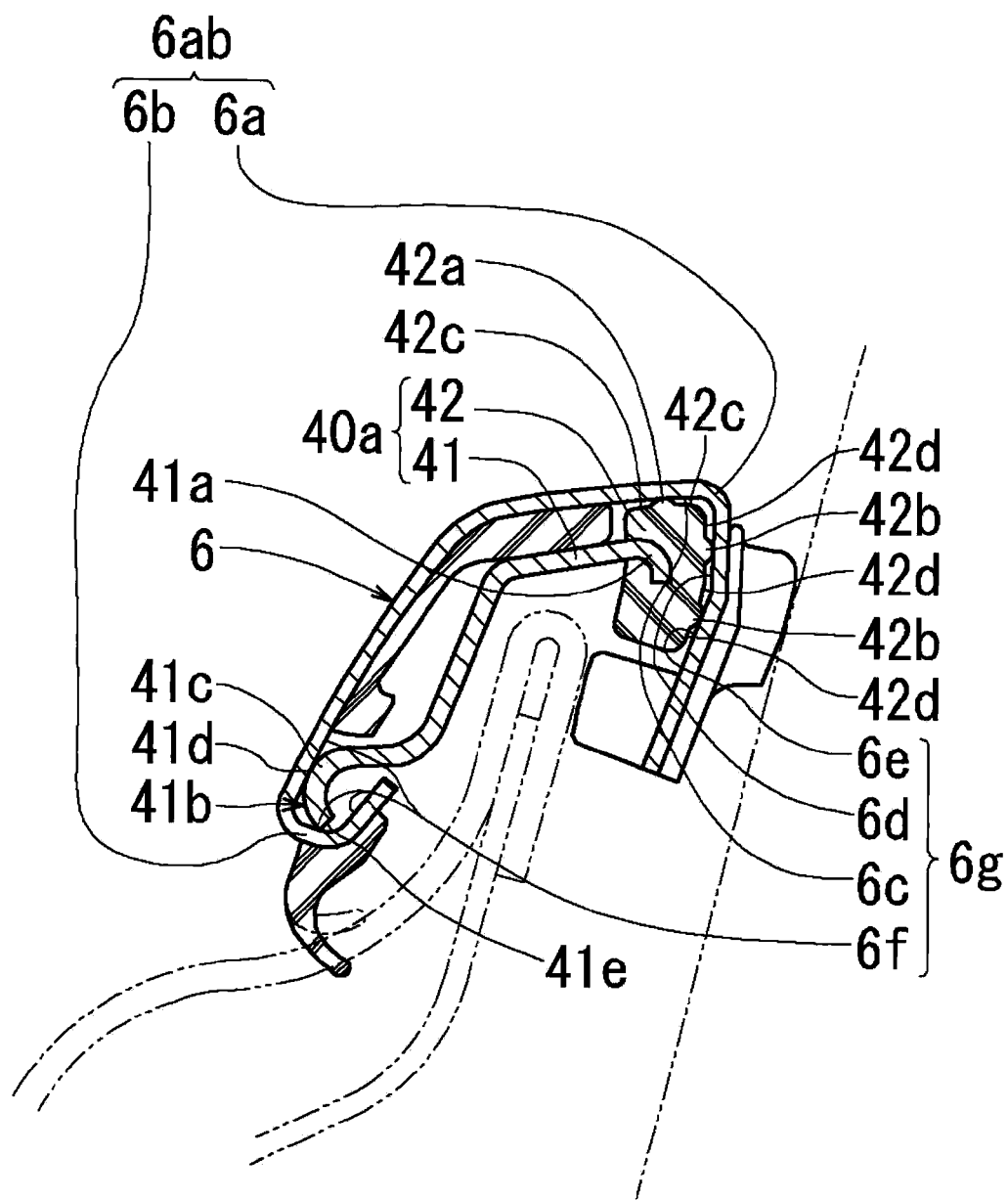
FIG. 4 is a cross-sectional view taken along line 4-4 in FIG. 2.
Figure 5:
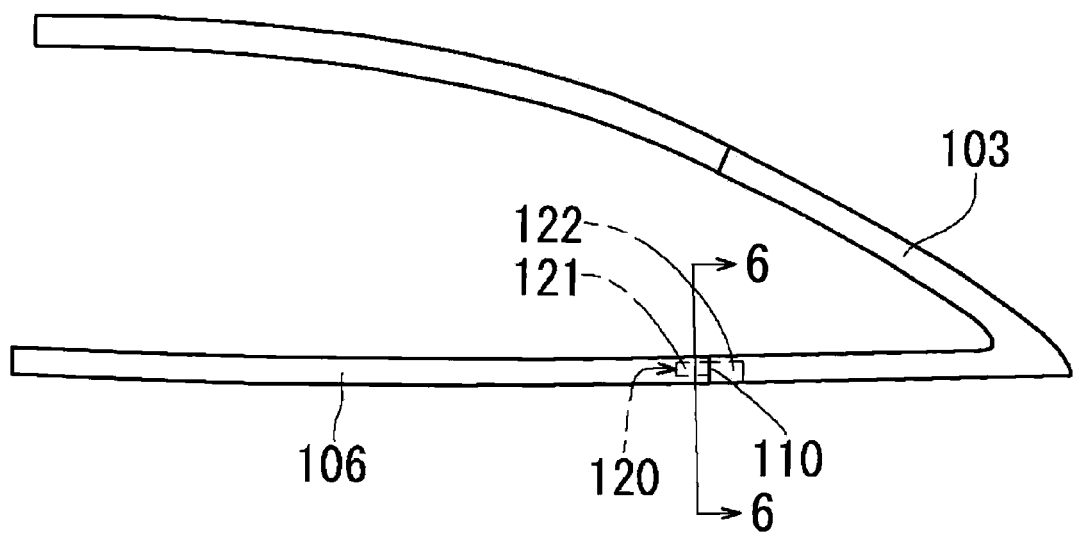
FIG. 5 is a schematic view showing a frame molding of the prior art from an inner side of a vehicle.

FIG. 4 is a cross-sectional view taken along line 4-4 in FIG. 2. That is, FIG. 4 is a cross-sectional view of the belt molding 6 in which the bracket 40 is inserted. As shown in FIGS. 3 and 4, the cross-section that is perpendicular to the longitudinal direction of the belt molding 6 is bag-shaped. The bag-shaped cross-section 6ab includes an upper end portion (first end portion) 6a, which is located at the upper right side as viewed in FIG. 4 and has a generally reverse L-shaped cross-section, and a lower end portion (second end portion) 6b, which is generally U-shaped. The belt molding 6 has an inner surface 6g including inner surfaces 6c, 6d, and 6e, which form the generally reverse L-shaped inner surface, and an inner surface 6f of the generally U-shaped lower end portion 6b.

The insertion portion 40a of the bracket 40 includes a stainless main body 41 and a resin member 42. The main body 41 includes an upper end portion 41a (first portion) and a lower end portion 41b (second portion). The resin member 42 is arranged near the upper end portion 41a of the main body 41. The cross-section of the resin member 42 perpendicular to the insertion direction (single direction) of the resin member 42 relative to the main body 41 has a generally rectangular shape. Outer surfaces 42c and 42d of the resin member 42 facing toward the upper end portion 6a of the belt molding 6 include ribs 42a and 42b having semi-circular cross-sections and extending along the overall length in the insertion direction. The resin member 42 is inserted into the upper end portion 6a of the belt molding 6. Further, the rib 42a abuts the inner surface 6c, and the two ribs 42b respectively abut the inner surfaces 6d and 6e.

In the present embodiment, the two outer surfaces 42c and 42d of the resin member 42 respectively include the ribs 42a and 42b. However, one of the outer surfaces 42c and 42d may include a rib, while the other does not include a rib. In such a case, the rib abuts one of the inner surfaces 6c, 6d, and 6e of the upper end portion 6a of the belt molding 6. It is preferable that the one of the outer surfaces 42c and 42d free from a rib abut at least one of the inner surfaces 6c, 6d, and 6d. Further, the outer surfaces 42c and 42d may both be free from the ribs 42a and 42b. In this case, at least one of the outer surfaces 42c and 42d abuts at least one of the inner surfaces 6c, 6d, and 6e. Further, in this case, it is preferable that the outer surface 42c abut the inner surface 6c, and the outer surface 42d abut at least one of the inner surfaces 6d and 6e.

The lower end portion 41b of the main body 41 includes an arced portion 41c having an arc-shaped cross-section that is perpendicular to the insertion direction. The lower end portion 41b, or the arced portion 41c, is inserted into the lower end portion 6b, and at least one of the convex surface 41d of the arced portion 41c or end surface 41e of the arced portion 41c abuts the inner surface 6f of the lower end portion 6b.

As described above, the resin member 42 and the lower end portion 41b of the main body 41 abut the inner surface 6g of the belt molding 6, which has a bag-shaped cross-section 6ab. This fits the bracket 40 to the belt molding 6.

The upper end portion 41a and lower end portion 41b of the main body 41 may both include a resin member, and the resin members may respectively abut the inner surface (at least one of the inner surfaces 6c, 6d, and 6e) of the upper end portion 6a in the belt molding 6 and the inner surface 6f of the lower end portion 6b in the belt molding 6. Preferably, each resin member includes a rib. Further, a resin member may be arranged in just the lower end portion 41b, and the resin member may abut the inner surface 6f of the lower end portion 6b and include a rib.

As shown in FIG. 3, the fixed portion 40b of the bracket 40 includes a resin member 43 molded to be fixed to the main body 41. A groove 43a is arranged in the middle of the resin member 43. The resin member 43 is inserted into and fixed to an end portion of the lower part 3a of the rear molding 3. More specifically, the end portion of the lower part 3a has a generally channel-shaped cross-section perpendicular to the longitudinal direction of the lower part 3a and includes the crimping hook 3b. In a state in which the resin member 43 of the fixed portion 40b is inserted into the end portion of the lower part 3a, the crimping hook 3b is bent so that the crimping hook 3b abuts the surface defining the groove 43a of the resin member 43 and crimps the resin member 43. This fixes the bracket 40 to the lower part 3a of the rear molding 3. In this manner, the bracket 40 fastens the belt molding 6 and the rear molding 3 in the coupling portion 11.

The resin member 42 and resin member 43 may be formed from a resin material such as glass fiber reinforced polypropylene (PPGF) or polypropylene (PP). However, from the viewpoint of strength, glass fiber reinforced polypropylene, which contains glass fibers in polypropylene to reinforce strength, is preferable. Further, the resin member 42 and resin member 43 may be formed from a resin material that contains fine powder of a ceramic, such as alumina, in a resin, such as an epoxy.

With regard to the upper molding 2, in the same manner as the belt molding 6, the insertion portion 40a of the bracket 40 is inserted into an end portion of the upper molding 2 that has a bag-shaped cross-section (not shown) at the coupling portion 10 (FIG. 1). The fixed portion 40b of the bracket 40 is fixed to the upper molding 2. This fastens the upper molding 2 to the rear molding 3 with the bracket 40 in the same manner as the belt molding 6.

This embodiment of the present invention has the advantages described below.

Figure 6:
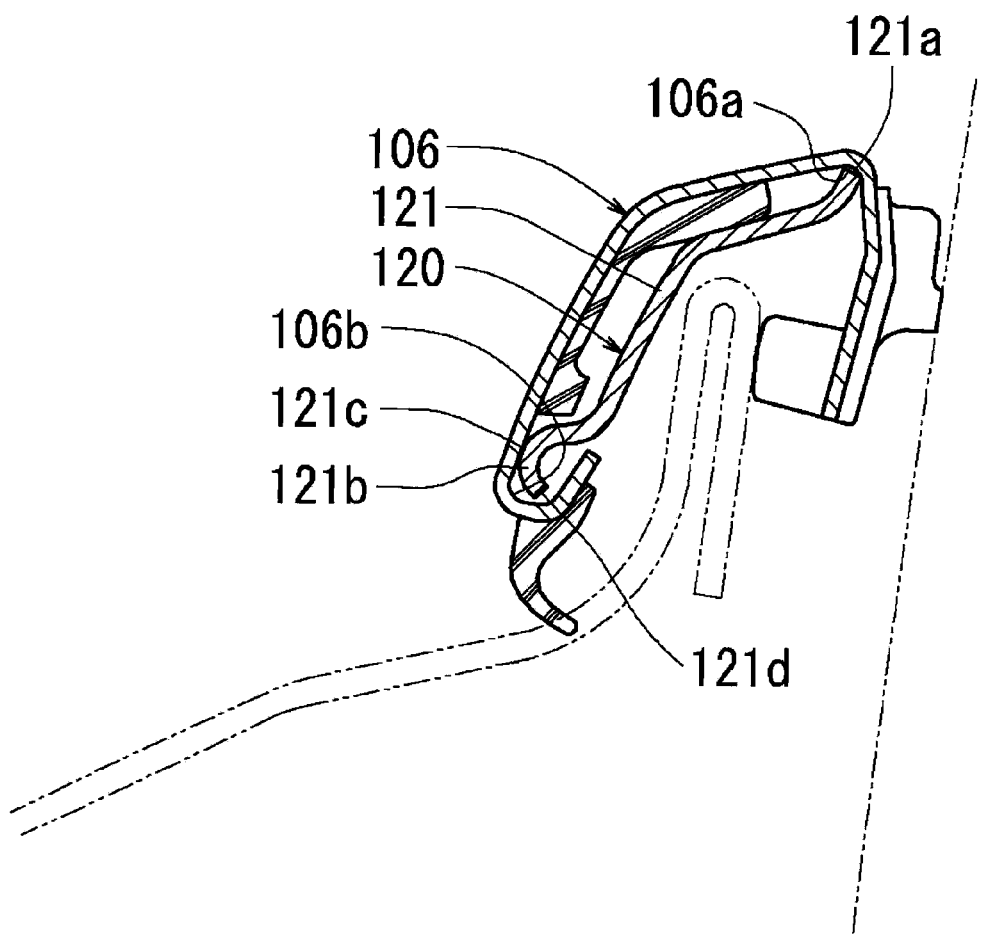
FIG. 6 is a cross-sectional view taken along line 6-6 in FIG. 5.

The insertion portion 40a of the bracket 40 includes the resin member 42 at the upper end portion 41a and the stainless arced portion 41c at the lower end portion 41b. Further, the insertion portion 40a is inserted into the end portion of the belt molding 6 that has a bag-shaped cross-section 6ab. The resin member 42 is inserted into the upper end portion 6a, which has a generally reverse L-shape, of the belt molding 6. The ribs 42a and 42b of the inserted resin member 42 respectively abut the inner surfaces 6c, 6d, and 6e of the upper end portion 6a. The abutment area of the ribs 42a and 42b is greatly increased in comparison with the contact area of the upper end portion 121a, which contacts the cornered inner surface 106a of the bracket 120 in the prior art shown in FIG. 6. Further, the arrangement of the ribs 42a and 42b in the resin member 42 increases the pressing surface pressure of the resin member 42 relative to the inner surface 6g of the belt molding 6.

At least one of the convex surface 41d and end surface 41e of the arced portion 41c abuts the inner surface 6f of the lower end portion 6b in the belt molding 6.

With the above-described structure, the coupling portion 11 arranged between the bracket 40 and belt molding 6 is prevented from becoming loose or corrugated, and the torsion and bending rigidity of the coupling portion 11 are improved. Further, the fixed portion 40b of the bracket 40 is fixed to the end portion of the lower part 3a. This prevents the coupling portion 11 arranged between the rear molding 3 and the belt molding 6 from becoming loose or corrugated, while also improving the torsion and bending rigidity of the coupling portion 11.

In the present embodiment, the two outer surfaces 42c and 42d of the resin member 42 respectively include the ribs 42a and 42b. However, one of the outer surfaces 42c and 42d may include a rib, while the other does not include a rib. Further, the outer surfaces 42c and 42d may both be free from the ribs 42a and 42b. In any case, the area in which the resin member 42 abuts the inner surface of the upper end portion 6a in the belt molding 6 is greatly increased in comparison with the contact area of the upper end portion 121a in the bracket 120 in the prior art shown in FIG. 6. Accordingly, the coupling portion 11 arranged between the rear molding 3 and the belt molding 6 is prevented from becoming loose or corrugated, and the torsion and bending rigidity of the coupling portion 11 are increased.

Further, as described above, the bracket 40 including the resin member 42 is inserted into the belt molding 6, and the resin member 42 abuts the inner surface 6g of the belt molding 6. This eliminates the need for welding and bolts to perform fastening, and reduces the fastening and coupling steps of the rear molding 3 and belt molding 6.

The strength and bending rigidity of the bracket 40 are increased by forming the resin member 42 and the resin member 43 from glass fiber reinforced polypropylene. Accordingly, the strength and bending rigidity of the coupling portion 11 between the rear molding 3 and the belt molding 6 are increased.

At least either one of the upper end portion 41a and lower end portion 41b in the main body 41 includes a resin member. The resin member is easier to cut than a metal material. This facilitates size and shape adjustment compared to the bracket 120 (FIG. 6) of the prior art.

This embodiment of the present invention includes the resin member 42 in the upper end portion 41a of the main body 41. However, as described above, a resin member may be arranged in both of the upper end portion 41a and lower end portion 41b or in just the lower end portion 41b. Each resin member may abut and be flush with at least one of the inner surfaces 6c, 6d, 6e, and 6f of the belt molding 6. Further, each resin member may include a rib. In any case, the abutment area of the resin member increases. This prevents the coupling portion 11 arranged between the rear molding 3 and the belt molding 6 from becoming loose or corrugated, while also improving the torsion and bending rigidity of the coupling portion 11.

DESCRIPTION OF REFERENCE CHARACTERS

2 . . . upper molding (second molding), 3 . . . rear molding (first molding), 6 . . . belt molding (second molding), 6ab . . . bag-shaped cross-section (cross-section), 6g . . . inner surface, 40 . . . bracket, 40a . . . insertion portion, 40b . . . fixed portion, 41 . . . main body, 41a . . . upper end portion (first portion), 41b . . . lower end portion (second portion), 42 . . . resin member, 42a and 42b . . . rib

The invention claimed is:

1. A fastening structure for a frame molding comprising:
a first molding;
a second molding; and
a bracket that fastens the first and second molding to each other, the bracket including a fixed portion fixed to the first molding and an insertion portion inserted into the second molding;
wherein the insertion portion includes a main body and a resin member, the main body includes a first portion, which is located at one end side of a cross-section perpendicular to an insertion direction of the insertion portion relative to the second molding, and a second portion, which is located at an end portion at an opposite side of the first portion, and the resin member is arranged in at least either one of the first portion and the second portion to abut an inner surface of the second molding,
the second molding includes a first end portion and a second end portion in a cross-section perpendicular to the insertion direction, the first end portion includes at least two surfaces forming a generally L-shaped inner surface, and the resin member includes two surfaces facing toward the two surfaces of the first end portion, and
the main body of the insertion portion is formed from metal, the resin member is arranged in only the first portion of the main body, and the second portion abuts the inner surface of the second end portion.

2. The fastening structure according to claim 1, wherein the resin member includes a rib that abuts the inner surface.

3. The fastening structure according to claim 1, wherein the resin member contains glass fibers.

4. The fastening structure according to claim 1, wherein the two surfaces of the resin member each include a rib.

5. The fastening structure according to claim 2, wherein the resin member contains glass fibers.

* * * * *